(12) United States Patent
Macrae

(10) Patent No.: US 7,957,425 B2
(45) Date of Patent: Jun. 7, 2011

(54) COMMUNICATING DISTINCT DATA USING POLARIZED DATA SIGNALS

(76) Inventor: Nigel Iain Stuart Macrae, Las Vegas, NV (US)

( * ) Notice: Subject to any disclaimer, the term of this patent is extended or adjusted under 35 U.S.C. 154(b) by 99 days.

(21) Appl. No.: 12/499,084

(22) Filed: Jul. 7, 2009

(65) Prior Publication Data

US 2011/0007758 A1    Jan. 13, 2011

(51) Int. Cl.
*H04J 1/00* (2006.01)
(52) U.S. Cl. ...................................... 370/480
(58) Field of Classification Search .................. 370/480
See application file for complete search history.

(56) References Cited

U.S. PATENT DOCUMENTS

| | | | | |
|---|---|---|---|---|
| 4,060,808 A * | 11/1977 | Foldes | ........................... | 342/352 |
| 5,831,582 A | 11/1998 | Muhlhauser et al. | | |
| 6,192,217 B1 * | 2/2001 | Farrell | ........................ | 455/13.1 |
| 7,003,058 B2 * | 2/2006 | Bach et al. | ..................... | 375/346 |
| 7,590,191 B1 * | 9/2009 | Macrae | ........................ | 375/299 |
| 2003/0052832 A1 * | 3/2003 | Alexopoulos et al. | ........ | 343/860 |
| 2006/0128336 A1 * | 6/2006 | Waltman et al. | ............. | 455/273 |
| 2007/0047678 A1 | 3/2007 | Sibecas et al. | | |
| 2008/0105449 A1 * | 5/2008 | Kenny et al. | .................... | 174/34 |
| 2010/0124187 A1 * | 5/2010 | Walker et al. | ................ | 370/316 |

* cited by examiner

*Primary Examiner* — Jason E Mattis
*Assistant Examiner* — Stephen J Clawson
(74) *Attorney, Agent, or Firm* — Ashok Tankha; Lipton, Weinberger & Husick

(57) ABSTRACT

A method and system is provided for communicating distinct data over a single frequency using multiple polarized data signals. Data signals of the single frequency conveying first data, second data, and third data are polarized in a first polarization scheme and a second polarization scheme. The data signals comprise a first data signal, a second data signal, a third data signal, and inverse of the third data signal in a first configuration or a second configuration. The polarized data signals are transmitted from transmitting stations to one or more receiving stations. The first data, second data, and third data are obtained from the data signals received at the receiving stations using an antenna of a first polarity and an antenna of a second polarity. The amount of distinct data transmitted over the single frequency is increased by, for example, about 50% without causing interference between the data signals.

18 Claims, 5 Drawing Sheets

COMMUNICATING DISTINCT DATA USING POLARIZED DATA SIGNALS

BACKGROUND

The method and system disclosed herein, in general, relates to information communication. More particularly, the method and system disclosed herein relates to communicating distinct data over a single frequency using multiple signals under at least two different polarization schemes.

Current satellites and ground based microwave radios, typically reuse frequencies by transmitting signals in two polarities of one of two polarization schemes: left and right hand circular polarization, or vertical and horizontal linear polarization. Normally, if different data signals are transmitted on the same frequency in both linear and circular polarizations, the data signals would interfere with each other. Consequently, no more than two different data signals are transmitted on the same frequency at an instant, representing the two polarities of a selected polarization scheme.

Another form of frequency reuse is through separation. Additional channels can be transmitted on the same frequencies as long as there is sufficient distance between the transmitters so that antennas can pick up the selected transmissions with minimal interference. In the case of satellites, the satellites must maintain a distance of about 2 degrees of arc before the same frequencies can be reused. In the case of televisions, terrestrial microwave radios, and radio stations, geographic distance is used to ensure sufficient distance or attenuation between the transmitters.

In linear polarization, the electric component or the magnetic component of an electromagnetic wave is confined to within a single plane along the direction of propagation of the electromagnetic wave. Linearly polarized signals are either horizontally linearly polarized or vertically linearly polarized. In circular polarization, the tip of the electric field vector is made to describe a circle as time passes. Circularly polarized data signals are either right hand circularly polarized or left hand circularly polarized. Elliptical polarization is similar to circular polarization, except that the angle vector changes in a non linear fashion. Polarity can be established by either the shape of the radiation elements in the case of a lower frequency antenna, for example frequency modulated (FM) radio antenna, or by a feed horn often feeding a larger, usually parabolic reflector in a higher frequency band. The different polarization schemes and this disclosure apply to any frequency electromagnetic waves that can be polarized including, for example, light, microwave, and radio frequency waves.

Linearly polarized data signals and circularly polarized data signals can be propagated in different fashions. In lower frequency signals, the shape of the antenna can determine the shape of the signal. In higher frequency signals having a frequency above 2 to 3 gigahertz (GHz), usually a feed horn and at least one reflector are typically used. In even higher frequencies, emitters and filters are used.

As used herein, the term "feed horn" refers to an apparatus that includes both a horn and a transducer, also called a polarizer. The transducer polarizes the signal for transmission. A transducer is a mechanical device that bolts to the back of the horn and shapes and transmits the signal, as well as picks up already polarized data signals for reception. A transducer also routes the data signals from a transmission side of input flanges to the horn or from the horn to a reception side of output flanges. A transducer can form or receive signals of linear, circular or both polarities. Elliptical transmissions are rarely used for communications, and for purposes of this disclosure, shall be treated as equivalent to circular transmissions.

Left hand circularly polarized data signals and right hand circularly polarized data signals interfere with each other only to an insignificant degree when transmitted together. Similarly, horizontal and vertical linearly polarized data signals basically do not interfere with each other when transmitted together. However, each pole of a linear feed and transducer, whether horizontal or vertical, picks up both left hand circularly polarized signals and right hand circularly polarized signals simultaneously in almost equal levels of about 3 decibels (dB) less than, therefore half of, the full strength of a correctly aligned circularly polarized feed. Similarly, an antenna or feed of circular polarity picks up the horizontal and vertical linearly polarized signals in both left and right circular polarities at about half the level of what a correctly aligned linear feed would. Along the axis of transmission, the rotation or angle of the linear receive feed in relation to the circular polarized transmission feed does not affect the reception level of circularly polarized signals in the linear feed. Similarly, each pole of a circular feed and transducer, whether left hand circular or right hand circular, typically picks up both horizontally polarized signals and vertically polarized signals in almost equal levels.

On any given frequency, normally attempting to transmit both linearly polarized signals and circularly polarized signals simultaneously results in so much interference in a receive antenna that the received signal is not usable. Linearly polarized signals suffer from interference from circularly polarized signals, whereas circularly polarized signals suffer from interference from linearly polarized signals.

Until now, due to the noise and interference involved, only a single polarization scheme can typically be used to communicate distinct data signals on the same frequency. This means on a given frequency a maximum of two data signals can be transmitted simultaneously, one on each polarity of the chosen polarization scheme. There is a need for transmitting an additional data signal along the same or proximate path resulting in about a 50% to about a 100% increase in capacity. Hence, there is an unmet need for communicating additional distinct data over a single frequency using multiple polarized data signals.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for communicating additional distinct data over a single frequency using multiple polarized data signals. The method and system disclosed herein transmits an additional data signal along the same or proximate path resulting in about a 50% to about a 100% increase in capacity.

Multiple data signals of the single frequency conveying first data, second data, and third data are provided. The first data is typically distinct from the second data but may be the same as the second data. The third data is distinct from the first data and the second data. The data signals are polarized in a first polarization scheme and a second polarization scheme. As exemplarily used herein, the first polarization scheme refers to linear polarization and the second polarization scheme refers to circular polarization. The polarized data signals comprise a first data signal, a second data signal, a third data signal, and an inverse of the third data signal in a first configuration or a second configuration. The first data signal conveys the first data, the second data signal conveys the second data, and the third data signal and an inverse of the third data signal convey the third data.

In the first configuration, the first data signal and the second data signal are polarized in, for example, the first polarization scheme, i.e., linear polarization, and the third data signal and the inverse of the third data signal are polarized in, for example, the second polarization scheme, i.e., circular polarization. The linearly polarized first data signal is, for example, a horizontally polarized signal. The linearly polarized second data signal is, for example, a vertically polarized signal. The third data signal and the inverse of the third data signal are inverse to each other, i.e., 180 degrees opposite to each other. The circularly polarized third data signal is, for example, a right hand circularly polarized data signal and the inverse of the circularly polarized third data signal is, for example, a left hand circularly polarized data signal.

The polarized third data signal and the inverse of the third data signal are transmitted from one transmitting station to one or more receiving stations. The polarized first data signal and the polarized second data signal are transmitted from either the same transmitting station or from other transmitting stations to one or more receiving stations.

When the circularly polarized inverse data signals are transmitted, the two circularly polarized data signals mirror each other in phase, and match each other in level for enabling the circularly polarized data signals to come as close to canceling each other out as possible when received together at a feed or an antenna of a linear polarity of a receiving station.

The linearly polarized data signals and the circularly polarized data signals are transmitted over the same frequency. The first data signal and the second data signal can be transmitted and received at locations entirely different from the third data signal and the inverse of the third data signal, or at the same location. The third data signal, and the inverse of the third data signal should be transmitted together for enabling the third data signal and the inverse of the third data signal to maintain their inverted phase relationship for canceling each other out when they arrive at a same antenna of a receiving station.

The transmitted data signals comprising the first data signal, the second data signal, the third data signal, and the inverse of the third data signal are received at one or more receiving stations. The first data, the second data, and the third data are obtained from the received data signals by decoding the received data signals using antennas and electronics at the receiving stations. The antennas provided to receive transmitted polarized data signals at the receiving stations comprise, for example, a first antenna of a first polarity and a second antenna of a second polarity. As exemplarily used herein, the first antenna refers to an antenna of a linear polarity, and the second antenna refers to an antenna of a circular polarity. Both functions may be combined in one antenna, but for simplicity separate antennas are specified.

In the first configuration, when the data signals are received by an antenna of the linear polarity, the linearly polarized first data signal and the linearly polarized second data signal are picked up in the respective linear polarity of the antenna. For example, the horizontally polarized first data signal is picked up in the horizontal polarity of the antenna and the vertically polarized second data signal is picked up in the vertical polarity of the antenna. Since the two circularly polarized data signals are inverse to each other, and are picked up at equal levels in each of the two polarities, i.e., the vertical polarity and horizontal polarity of the linear receive feed or antenna, they cancel each other out before any electronic processing of the data signals. Electronic processing of the linearly polarized data signals occurs as it normally would in an antenna of a linear polarity. Both vertically polarized data signals and horizontally polarized data signals are processed as they normally would be with little or no interference from the circularly polarized data signals.

In the first configuration, when the circularly polarized data signals are received by the antenna of circular polarity, they must both be received together and maintained as separate data signals until they are processed. Once received, one of the two circularly polarized data signals is inverted and summed in phase with the other, thereby enabling the two circularly polarized data signals to match each other for increasing the signal strength of the circularly polarized data signals. Since, at the same time one of the two circularly polarized data signals is inverted, both interfering linearly polarized data signals being part of the same signal received in the same pole are inverted, upon summation with the other circularly polarized data signal, the two interfering linearly polarized data signals negate each other, thereby canceling each other out.

For example, in the right hand circular polarity of the antenna, the right hand circularly polarized data signals containing the third data signal along with both of the linearly polarized data signals are received. In the left hand circular polarity of the same antenna, the inverse of the third data signal and both of the linearly polarized data signals are received. The received data signals from the left hand circular polarity of the same antenna are inverted to obtain the inverse of the horizontally polarized data signal, the inverse of the vertically polarized data signal, and the inverse of the inverse of the third data signal, all as one signal. The data signal in the left hand circular polarity of the same antenna is then phase corrected if necessary to compensate for reception time delays between the two polarities in the receiving station, then summed with the received data signal from the right hand circular polarity of the same antenna. Upon summation, the horizontally polarized data signals and the inverted horizontally polarized data signals cancel each other out, and the vertically polarized data signals and the inverted vertically polarized data signals cancel each other out. The third data signal and the inverse of the inverse of the third data signal match each other to increase signal strength of the third data signal, thereby enabling the antenna of the circular polarity and electronics to decode the third data.

In the second configuration, the first data signal and the second data signal are polarized in, for example, the second polarization scheme, i.e., circular polarization, and the third data signal and the inverse of the third data signal are polarized in, for example, the first polarization scheme, i.e., linear polarization. The circularly polarized first data signal is, for example, a right hand circularly polarized data signal and the circularly polarized second data signal is, for example, a left hand circularly polarized data signal. The linearly polarized third data signal is, for example, a horizontally polarized data signal and the inverse of the linearly polarized third data signal is, for example, a vertically polarized data signal. In the second configuration, the linearly polarized data signals comprise two polarized data signals containing identical data, except the linearly polarized third data signal and the inverse of the third data signal are exactly inverse to each other. At transmission, the phase and level of the third data signal and the inverse of the third data signal are adjusted, if necessary, for enabling the third data signal and the inverse of the third data signal to cancel each other out when received together at a same antenna or feed horn of the circular polarity. When transmitted, the linearly polarized data signals comprise two polarized data signals that are inverse to each other, i.e., 180 degrees opposite to each other. When the linearly polarized data signals are transmitted, the two data signals mirror each other in phase, and match each other in level for enabling the linearly polarized data signals to come as close to canceling each other out as possible when received together at an antenna of circular polarity of the receiving stations.

In the second configuration, when the data signals are received by an antenna of circular polarity, the circularly polarized first data signal and the circularly polarized second data signal are received and decoded by the right hand circular polarity and the left hand circular polarity of the same antenna respectively. The linearly polarized third data signal and the inverse of the third data signal cancel each other out completely at reception at each antenna of circular polarity. The circularly polarized data signals are processed and decoded as they would normally be, as if there were no linearly polarized data signals. Both the left hand circularly polarized data signal and the right hand circularly polarized data signal are received at either the same antenna of circular polarity or separate antennas of left hand circular polarity and right hand circular polarity respectively.

In the second configuration, the third data signal and the inverse of the third data signal both are received by an antenna of linear polarity. The third data signal and the inverse of the third data signal should be received in separate poles in the antenna of linear polarity. The data signals received in either the horizontal polarity or the vertical polarity are inverted, and one of the two sets of data signals is phase adjusted if necessary, then summed with the other polarity data signals. When the data signals are inverted and summed together, the linearly polarized data signals match each other, thereby increasing the signal strength of the linearly polarized data signals. Since the two interfering circularly polarized data signals are received at equal levels in both linear ports, and one of the two received signals is inverted, the interfering circularly polarized data signals negate each other, thereby canceling each other out at summation, resulting in minimal interference to the linearly polarized data signals. In the antenna of linear polarity, for example, the horizontal polarity, the third data signal, and both circularly polarized data signals are received. In the vertical polarity, the inverse of the third data signal and both the circularly polarized data signals are received. One of the received sets of data signals, for example, the data signal comprising the inverse of the third data signal and the circularly polarized data signals received in the vertical polarity of the same antenna is inverted and summed with the other received data signals, for example, the data signal comprising the third data signal and the circularly polarized data signals received in the horizontal polarity of the same antenna. Upon summation, the left hand circularly polarized data signals and the inverse of the left hand circularly polarized data signals cancel each other out, and the right hand circularly polarized data signals and the inverse of the right hand circularly polarized data signals cancel each other out. The third data signal and the inverse of the inverse of the third data signal match each other to increase signal strength of the third data signal enabling the antenna of linear polarity to decode the third data.

The transmitted data signals are received at one or more receiving stations whether the data signals are transmitted in the first configuration or in the second configuration. The first data, the second data, and the third data are obtained from the received data signals. The amount of distinct data transmitted to the receiving stations over the single frequency is therefore increased.

Currently spacecrafts need to be located at least two degrees apart in order to re-use the same frequencies used for transmitting data. The method and system disclosed herein allows the spacecraft to be collocated, each using a different polarization scheme. The result is about a 50% increase in capacity. Similarly, terrestrial microwave radio links would experience about a 50% increase in capacity using the method and system disclosed herein. In the case of television or radio, normally both polarities transmit the same information. When both polarities carry the same information, about a 100% increase in information transmitted can be accomplished by using the method and system disclosed herein. Capacity can be increased in any transmission medium that allows for transmission of polarized electromagnetic signals.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
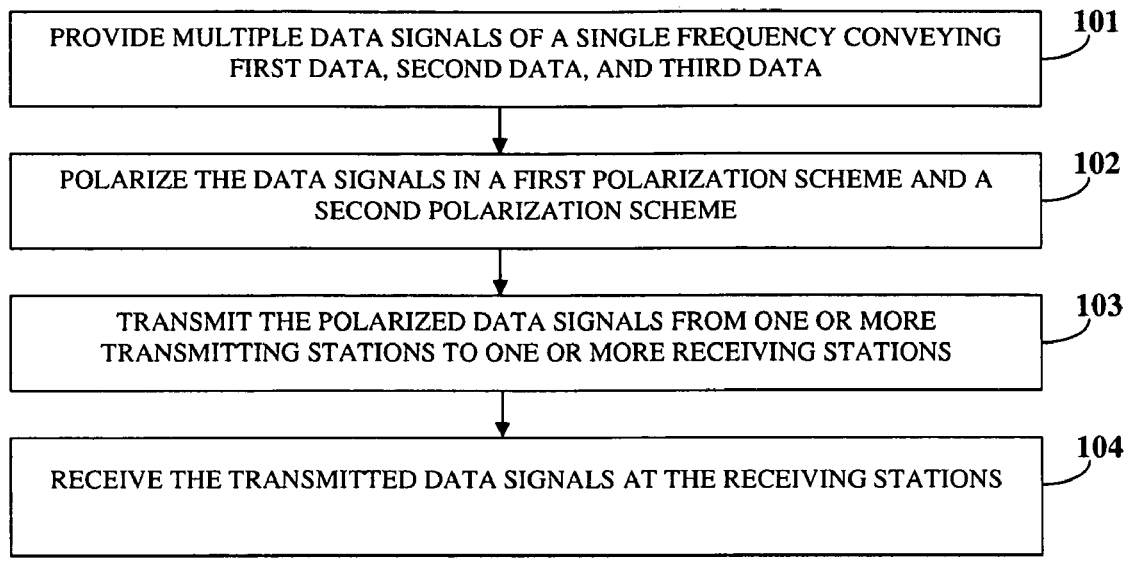
FIG. 1 illustrates a method of communicating distinct data over a single frequency using multiple polarized data signals.

FIG. 1 illustrates a method of communicating distinct data over a single frequency using multiple polarized data signals. Multiple data signals of the single frequency conveying first data, second data, and third data are provided 101. The first data is either distinct from the second data or the same as the second data. The third data is usually distinct from the first and second data. Data signals typically occupy a range of frequencies referred to as a frequency band. Each frequency band is a contiguous set of frequencies with a center frequency and multiple side frequencies. As used herein, the term "single frequency" refers to a frequency band having a center frequency and multiple side frequencies. Two signals of the "same frequency" means that at least one of the frequencies used to transmit a data signal is the same for both signals, i.e., that at least part of the band of frequencies overlaps. Both data signals can occupy the same band or partially overlapping bands. The data signals can convey digital or analog information. The data signals are polarized 102 in a first polarization scheme and a second polarization scheme. For purposes of illustration, the first polarization scheme refers to linear polarization and the second polarization scheme refers to circular polarization; however the scope of the method and system disclosed herein is not limited to the first polarization scheme being linear polarization and the second polarization scheme being circular polarization but they may refer to any polarization scheme. The polarized data signals comprise a first data signal, a second data signal, a third data signal, and an inverse of the third data signal in a first configuration or a second configuration. The first data signal conveys the first data, the second data signal conveys the second data, and the third data signal and the inverse of the third data signal convey the third data. Also, as used herein, the term "antenna" refers to any device capable of receiving or transmitting polarized electromagnetic signals.

The polarized data signals are configured in a first configuration and a second configuration. In the first configuration, the first data signal and the second data signal are polarized in, for example, the first polarization scheme, i.e., linear polarization, and the third data signal and the inverse of the third data signal are polarized in, for example, the second polarization scheme, i.e., circular polarization. The first data signal is, for example, horizontally polarized. The second data signal is, for example, vertically polarized. The third data signal and the inverse of the third data signal are inverse to each other, i.e., 180 degrees opposite to each other. The third data signal is, for example, a right hand circularly polarized data signal and the inverse of the third data signal is, for example, a left hand circularly polarized data signal.

In the second configuration, the third data signal and the inverse of the third data signal are polarized in, for example, the first polarization scheme, i.e., linear polarization, and the first data signal and the second data signal are polarized in, for example, the second polarization scheme, i.e., circular polarization. The first data signal is, for example, a right hand circularly polarized data signal and the second data signal is, for example, a left hand circularly polarized data signal. The third data signal is, for example, a horizontally polarized data signal and the inverse of the third data signal is, for example, a vertically polarized data signal. In the second configuration, the linearly polarized data signals comprise two polarized data signals containing the same data. However, the linearly polarized third data signal and the inverse of the third data signal are exactly inverse to each other.

In both configurations, the polarized data signals are made inverse to each other by making a copy of the original data signal and flipping the copy over so that when the original data signal is combined with the flipped copy they cancel. This combining occurs in the receive antenna or feed horn at reception at the receive antenna or in the electronics depending on the polarization scheme. The original data signal and the flipped copy are phase adjusted at transmission so that the original data signal and the flipped copy both arrive at a receive antenna at the same time, and are level adjusted for enabling cancellation of each other when combined.

The first data signal and the second data signal in the first polarization scheme comprise two signals unique to the data signals in the second polarization scheme, and usually are unique to each other but may be the same as each other.

The polarized data signals are transmitted 103 from one or more transmitting stations to one or more receiving stations. For example, the third data signal and the inverse of the third data signal are transmitted from the same transmitting station while the first data signal and the second data signal are transmitted either from the same transmitting station or other transmitting stations to one or more receiving stations. The first data signal and the second data signal may be transmitted from a single transmitting station or different transmitting stations. The transmitted data signals are received 104 at one or more receiving stations using an antenna of a first polarity, for example, a linear polarity and an antenna of a second polarity, for example, a circular polarity. This could occur in one antenna with a feed that can receive both polarizations, or at separate antennas. For purposes of this application, they are treated as separate antennas.

At each of the receiving stations, the first data, the second data, and the third data are obtained from the received data signals by decoding the received data signals. Each of the receiving stations comprises receive antennas, for example, an antenna of a first polarity scheme, an antenna of a second polarity scheme, or an antenna of both polarity schemes, and electronics for decoding the received data signals. As exemplarily used herein, an antenna of a first polarity refers to an antenna of a linear polarity and an antenna of a second polarity refers to an antenna of a circular polarity. Antennas of a linear polarity are responsible for receiving the linearly polarized data signals and the antennas of a circular polarity are responsible for receiving the circularly polarized data signals.

In the first configuration, at the time the circularly polarized data signals are transmitted, the two circularly polarized data signals mirror each other in phase, and match each other in level for enabling the circularly polarized data signals to come as close to canceling each other out as possible when received together at an antenna of linear polarity at the receiving stations. The linearly polarized data signals and the circularly polarized data signals are transmitted over the same frequency. The first data signal and the second data signal can be transmitted and received at locations entirely different from the third data signal and the inverse of the third data signal, or at the same location. The third data signal and the inverse of the third data signal transmitted in the circular polarization in this first configuration should be transmitted together from the same location so that the data signals stay inverse and synchronous to each other during propagation through space. The third data signal and the inverse of the third data signal should be exactly inverse of each other for canceling each other out when they arrive at an antenna of linear polarity at the receiving stations. Antennas or feeds of linear polarity pick up both right hand circularly polarized data signals and left hand circularly polarized data signals in equal levels in each linear pole of the same antenna. Since the two circularly polarized signals are inverse to each other, and are received at the same level, they cancel at reception in the linear feed. The first data signal and the second data signal are transmitted from the same location or locations different from each other.

In the first configuration, when the data signals are received by an antenna of the linear polarity, the linearly polarized first data signal and the linearly polarized second data signal are picked up in the respective linear polarity of the antenna. For example, the horizontally polarized first data signal is picked up in the horizontal polarity of the antenna and the vertically polarized second data signal is picked up in the vertical polarity of the antenna. Electronic processing of the linearly polarized data signals occurs as it normally would in an antenna of a linear polarity. Both vertically polarized data signals and horizontally polarized data signals are processed as they normally would be with little or no interference from the circularly polarized data signals.

In the first configuration, the circularly polarized data signals comprise two polarized data signals that are inverse to each other, i.e., 180 degrees opposite to each other. The circularly polarized data signals are transmitted to cancel each other out when received together at similar levels, therefore in any antenna of linear polarity, the circularly polarized data signals cancel each other out before reaching the receive electronics. Therefore, no processing of the circularly polarized data signals is required in the linear receive electronics, and the receive systems behave as they would in the absence of the circularly polarized data signals.

In the first configuration, in order to decode the third data transmitted in circular polarity, data signals of both circular polarities must be received separately in an antenna of circular polarity, such as in a four port circular feed. Once the polarized data signals are received by the antenna or feed of circular polarity, one of the polarized data signals may be phase compensated for timing delays in the receive system. Then one of the circularly polarized data signals is inverted and summed together with the other in the electronics, enabling the circularly polarized third data signal and the inverted inverse of the circularly polarized third data signal to match each other for increasing the signal strength of the circularly polarized data signals. Since each of the third data signals contains two normally interfering linearly polarized data signals, and since one of these third data signals has been inverted at the receive site, the linearly polarized data signals negate each other upon summation, thereby canceling each other out. In, for example, the right hand circular polarity of the antenna, a data signal is received containing the third data signal and each of the linearly polarized data signals. In the left hand circular polarity of the same antenna, the inverse of the third data signal and each of the linearly polarized data signals are received. The received data signal, for example, in the left hand circular polarity of the same antenna, is inverted to obtain the inverse of the horizontally polarized data signal, the inverse of the vertically polarized data signal, and the inverse of the inverse of the third data signal. This inverted data signal is then summed with the received data signal in the right hand circular polarity of the same antenna. The horizontally polarized data signals and the inverted horizontally polarized data signals cancel each other out, and the vertically polarized data signals and the inverted vertically polarized data signals cancel each other out. The third data signal and the inverse of the third data signal match each other to increase signal strength of the third data signal enabling the antenna of circular polarity to decode the third data.

In the second configuration, when the linearly polarized third data signal and the inverted third data signal are transmitted, the two polarized data signals mirror each other in phase, and match each other in level for enabling the linearly polarized data signals to come as close to canceling each other out as possible when received together at an antenna of circular polarity at the receiving stations. The linearly polarized data signals and the circularly polarized data signals are transmitted over the same frequency. The first data signal and the second data signal can be transmitted and received at locations entirely different from the third data signal and the inverse of the third data signal, or at the same location. The third data signal, and the inverse of the third data signal should be transmitted together from the same location so that the data signals stay inverse and synchronous to each other during propagation through space. The third data signal and the inverse of the third data signal must be inverse of each other and transmitted exactly inverse for canceling each other out when they arrive at a circular antenna of each of the receiving stations. The first data signal and the second data signal are transmitted from the same location or locations different from each other and from the third data signal.

In the second configuration, the linearly polarized data signals comprise two polarized data signals that are inverse to each other, i.e., 180 degrees opposite to each other. Each polarity of a circular antenna receives both linear polarized data signals in equal levels. Circular feeds or antennas pick up both the horizontal and vertical linearly polarized data signals in equal levels in each circular polarity. The linear polarized data signals are designed to cancel each other out when received together at similar levels, therefore in any antenna of circular polarity, the linearly polarized data signals cancel each other out before reaching the receive electronics. Therefore, no processing of the linear polarized data signals is required in the circular polarity antenna receive electronics, and the receive systems behave as they would in the absence of the linearly polarized data signals. The linear transmissions are transparent to the circular polarity receiving station electronics. The circularly polarized signals are processed as they normally would be in the case there were no interfering linearly polarized data signals.

In the second configuration, to acquire the third data the linearly polarized data signals must be picked up in separate linear polarities, for example, the horizontal polarity and vertical polarity, for further processing. The linearly polarized third data signal and the inverse of the linearly polarized third data signal are picked up in different poles of the same antenna. When the linearly polarized data signals are received by the antenna of linear polarity, the circularly polarized first data signal and the circularly polarized second data signal are also picked up. After any necessary phase adjustments to keep the third data signal and its inverse 180 degrees out of phase, one of the data signals received in one polarity of the antenna of linear polarity is inverted and summed with the other polarity data signal. When the data signals are inverted and summed together, the linearly polarized data signals match each other, thereby increasing the signal strength of the linearly polarized data signals. Since each of the two linearly polarized data signals contains a copy of the first data signal and the second data signal, and one has been inverted, when the horizontal data signal and the vertical data signal are summed, the two interfering circularly polarized data signals containing the first and the second data cancel each other out, causing minimal interference to the linearly polarized data signals.

In the antenna of linear polarity, for example, in the horizontal polarity, the third data signal and the circularly polarized data signals are received. In the vertical polarity of the same antenna, the inverse of the third data signal and the circularly polarized data signals are received. One of the received data signals, for example, the data signal comprising the inverse of the third data signal and the circularly polarized data signals received in the vertical polarity of the same antenna is inverted and summed with the other received data signals, that is the signal comprising the third data signal and the circularly polarized data signals received at the horizontal polarity of the same antenna or feed or pick up element. Upon summation, the left hand circularly polarized data signals and the inverse of the left hand circularly polarized data signals cancel each other out, and the right hand circularly polarized data signals and the inverse of the right hand circularly polarized data signals cancel each other out. The third data signal and the inverse of the inverse of the third data signal match each other to increase signal strength of the third data signal enabling the antenna of linear polarity and electronics at the receiving station to decode the third data.

In another configuration, two polarized data signals are transmitted on two different polarities of a single polarization scheme from a same antenna. The two polarized data signals are a first signal comprising a carrier signal and a data signal, and a second signal comprising a carrier signal and an inverse of the data signal. At summation the data signals cancel as before, except the carrier remains. The polarized signals in the other polarization scheme have guard bands, that is frequencies not used, falling exactly on the frequency of the carrier signal.

Figure 2:
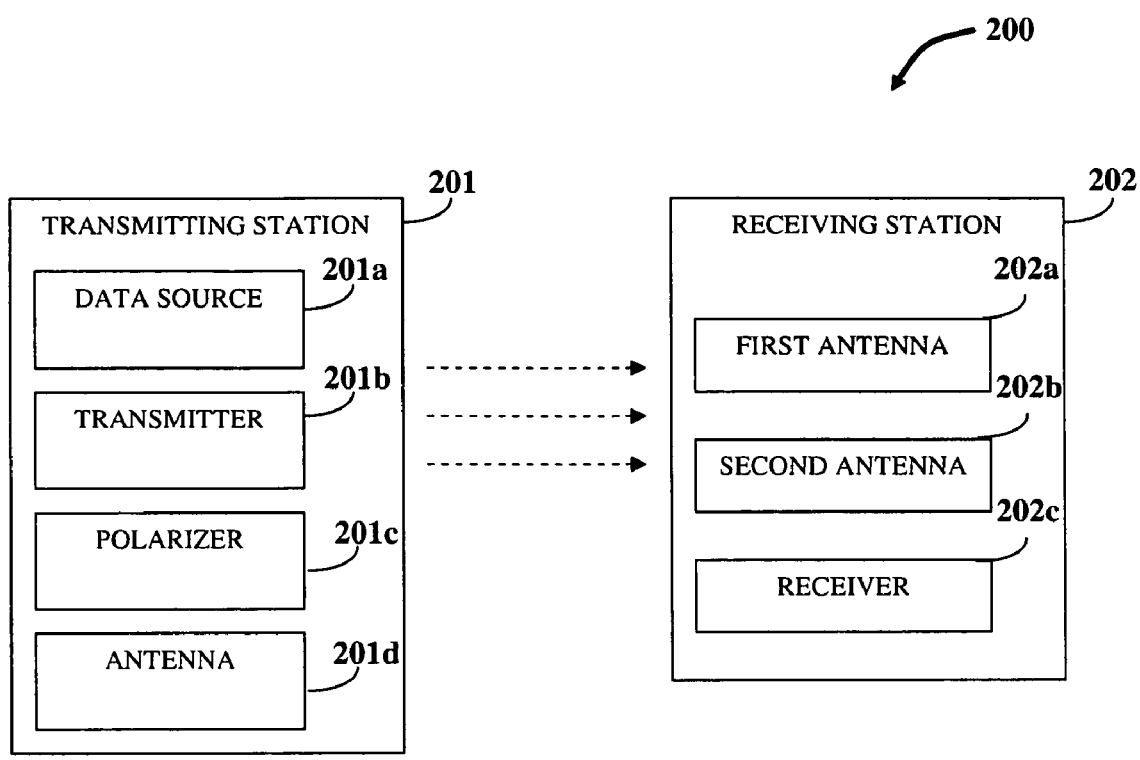
FIG. 2 exemplarily illustrates a system for communicating distinct data over a single frequency using multiple polarized data signals.

FIG. 2 exemplarily illustrates a system 200 for communicating distinct data over a single frequency using multiple polarized data signals. The system 200 comprises a transmitting station 201 and a receiving station 202. The transmitting station 201 comprises a data source 201a, a transmitter 201b, a polarizer 201c, and an antenna 201d. The data source 201a provides multiple data signals conveying the distinct data. The data signals are of the single frequency. The transmitter 201b comprises one or more transmission devices for transmitting each of the data signals. The polarizer 201c polarizes each of the data signals in a first polarization scheme and a second polarization scheme. The antenna 201d at the transmitting station 201 transmits each of the polarized data signals comprising the first data signal, the second data signal, the third data signal, and the inverse of the third data signal to each of one or more receiving stations 202.

The receiving station 202 comprises a first antenna 202a of a first polarity, for example, a linear polarity, a second antenna 202b of a second polarity, for example, a circular polarity, and a receiver 202c. The antenna 202a of linear polarity receives the linearly polarized data signals. In the first configuration, noise caused by the circularly polarized data signals cancel each other out at the antenna 202a feed or pick up element of linear polarity. Linearly polarized data signals are processed as they would be in the absence of interfering circularly polarized data signals. The antenna 202b of circular polarity receives the circularly polarized data signals. The receiver 202c receives the transmitted data signals. At the antenna 202b of circular polarity, noise caused by the linearly polarized signals is canceled by inverting one of the two received circularly polarized data signals and summing with the data signal from the opposite circular polarity. The method implemented by the system 200 disclosed herein is explained in the detailed description of FIG. 1.

Figure 3:
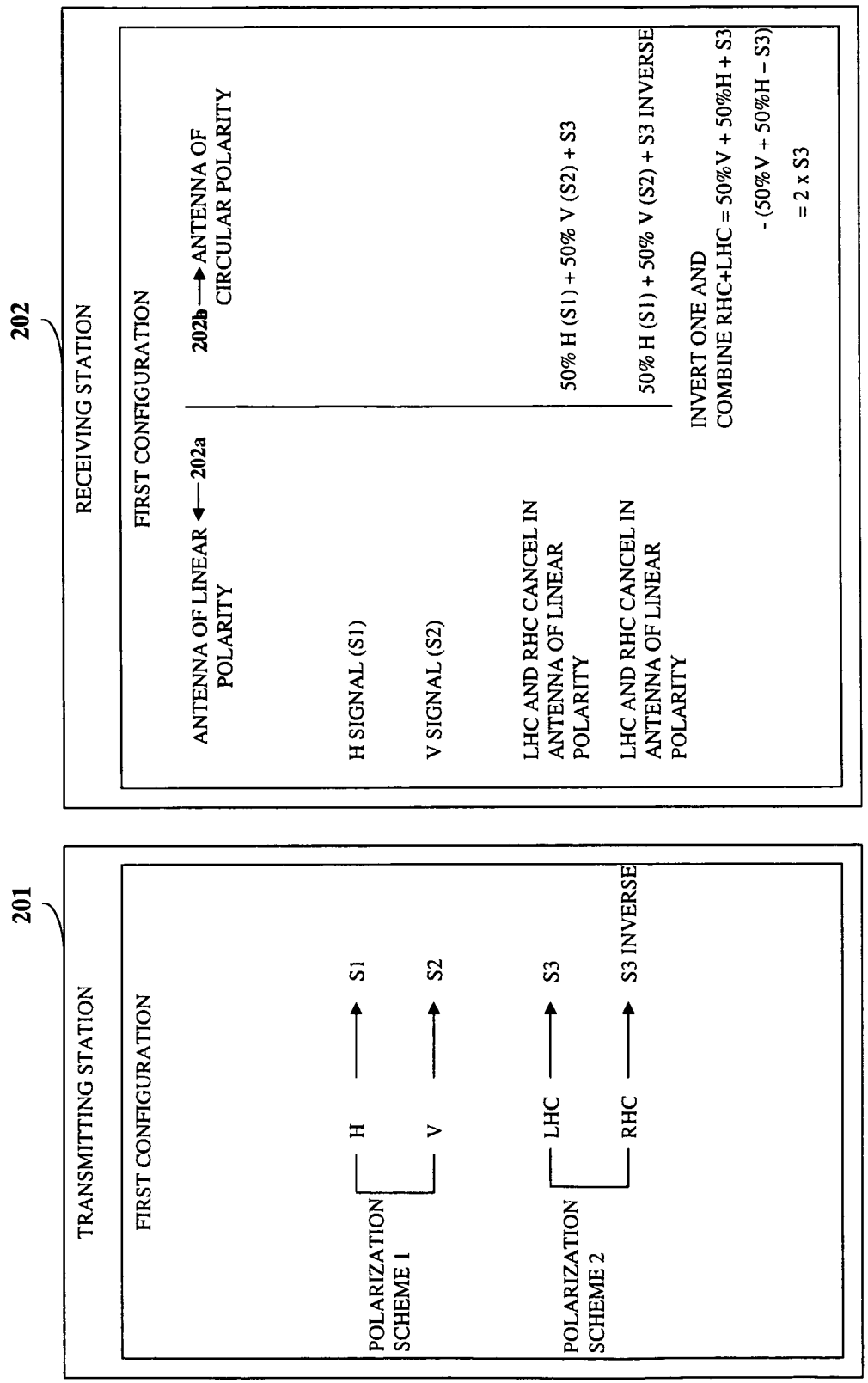
FIG. 3 exemplarily illustrates reception of data signals transmitted in a first configuration at a receiving station.

FIG. 3 exemplarily illustrates reception of data signals transmitted in a first configuration at a receiving station 202. The polarity of the transmitted data signals decides the data received at the receiving stations 202 since up to four data signals are being transmitted, two in each polarization scheme.

In the first configuration, the third data signal and the inverse of the third data signal are polarized in the second polarization scheme, and the first data signal and the second data signal are polarized in the first polarization scheme. For example, the first data signal is a horizontally (H) polarized data signal (S1), the second data signal is a vertically (V) polarized data signal (S2), the third data signal is a left hand circularly (LHC) polarized data signal (S3), and the inverse of the third data signal is a right hand circularly (RHC) polarized data signal (S3 inverse).

When the data signals are received by an antenna 202a of linear polarity at the receiving station 202, the horizontally (H) polarized data signal (S1) and the vertically (V) polarized data signal (S2) are picked up in the respective linear polarity, that is, horizontal polarity and vertical polarity, of the antenna 202a respectively. The LHC polarized data signal S3 and the RHC polarized data signal S3 inverse cancel each other out on reception by an antenna 202a of linear polarity, as the RHC polarized data signal is the inverse of the LHC polarized data signal, and both are received together at the same level, and are inverse so as to cancel.

When the data signals are received by an antenna 202b of circular polarity, the LHC polarized data signal S3 and the RHC polarized data signal S3 inverse are picked up in the LHC and RHC receive poles of the antenna 202b of circular polarity respectively. In order to receive the third data at each of the receiving stations 202, the inverse of the third data signal is inverted and summed in phase with the third data signal at the receiving station 202 thereby enabling the two circularly polarized data signals to match each other for increasing the signal strength of the circularly polarized third data signal. Since one copy of the two circularly polarized data signals is inverted the interfering linearly polarized data signals are also inverted. When one circular polarized signal is inverted and summed with the other circularly polarized data signal, the linearly polarized data signals cancel each other out, while the third data signal S3 is increased.

Normally two circularly polarized data signals interfere with each other and produce noise when received in an antenna 202a of linear polarity. In the method and system 200 disclosed herein, noise is prevented since the two circularly polarized data signals are inverse to each other and cancel each other out when received together at equal strength as happens in an antenna 202a of linear polarity. If the data signals are polarized in the first configuration, the right hand circularly polarized data signal and the left hand circularly polarized data signal are inverse to each other and cancel each other out when received at the antenna 202a of linear polarity. Hence, the electronics of the antenna 202a of linear polarity receive the linearly polarized data signals without interference from the circularly polarized data signals. The antenna 202a of linear polarity thus obtains the first data and the second data as it would without any interfering circularly polarized data signals.

To pick up the third data from the circularly polarized data signals in the first configuration, the antenna 202b of circular polarity at the receiving station 202 must be capable of receiving and discriminating both the left hand circularly polarized data signal and the right hand circularly polarized data signal. The data signals received at one pole of the antenna 202b of circular polarity are inverted and summed with the other data signals received by the other pole of the same antenna 202b, after performing any necessary phase and level adjustments for matching the third data signal with the inverted inverse of the third data signal. When the data signals received by the right hand circular polarity of the antenna 202b are inverted, one copy of the two interfering linearly polarized data signals is also inverted. When the inverted data signals at the right hand circular polarity of the antenna 202b are summed with the received data signals 202b at the left hand circular polarity of the antenna 202b, the linearly polarized data signals cancel each other out, and the two circularly polarized data signals sum to almost twice the strength. The interfering linearly polarized data signals cancel each other out since each pole of the antenna 202b of circular polarity picks up both the horizontally polarized data signals and the vertically polarized data signals at about equal strength.

As exemplarily illustrated in FIG. 3, in the LHC polarity of the antenna 202b, the LHC polarized data signal containing the third data signal S3 along with the H polarized data signal S1 and the V polarized data signal S2 are received. In the RHC polarity of the same antenna 202b, the inverse of the third data signal S3 inverse along with the H polarized data signal S1 and the V polarized data signal S2 are received. The received data signals at the RHC polarity of the same antenna 202b, that is, S1, S2, and S3 inverse are inverted and combined with the received data signals at the LHC polarity of the same antenna 202b, that is, S1, S2, and S3. Upon summation, S1 and the inverted S1 cancel each other out, S2 and the inverted S2 cancel each other out, while the inverted S3 inverse and S3 match each other to increase signal strength of S3, thereby enabling the antenna 202b of the circular polarity and electronics to decode the third data.

The phase and amplitude of the third data signal or the inverse of the third data signal is adjusted at transmission so that one of the data signals is the exact inverse of the other data signal, thereby enabling cancellation of the data signals when received together. Also, a tone or a carrier and its inverse may be transmitted and used to adjust the amplitude and phase of the inverse of the third data signal for reducing the noise caused to the received first and second data signals.

The polarized data signals inverse to each other need not always cancel each other out completely at the receiving station 202 due to phase changes occurring, for example, during the transmission of the data signals from a transmitting station 201 to a receiving station 202. The phase of one of the polarized data signals received by the receiving station 202 can be adjusted to ensure maximum cancellation of inverse data signals at the receiving station 202 for negating or attenuating noise.

Figure 4:
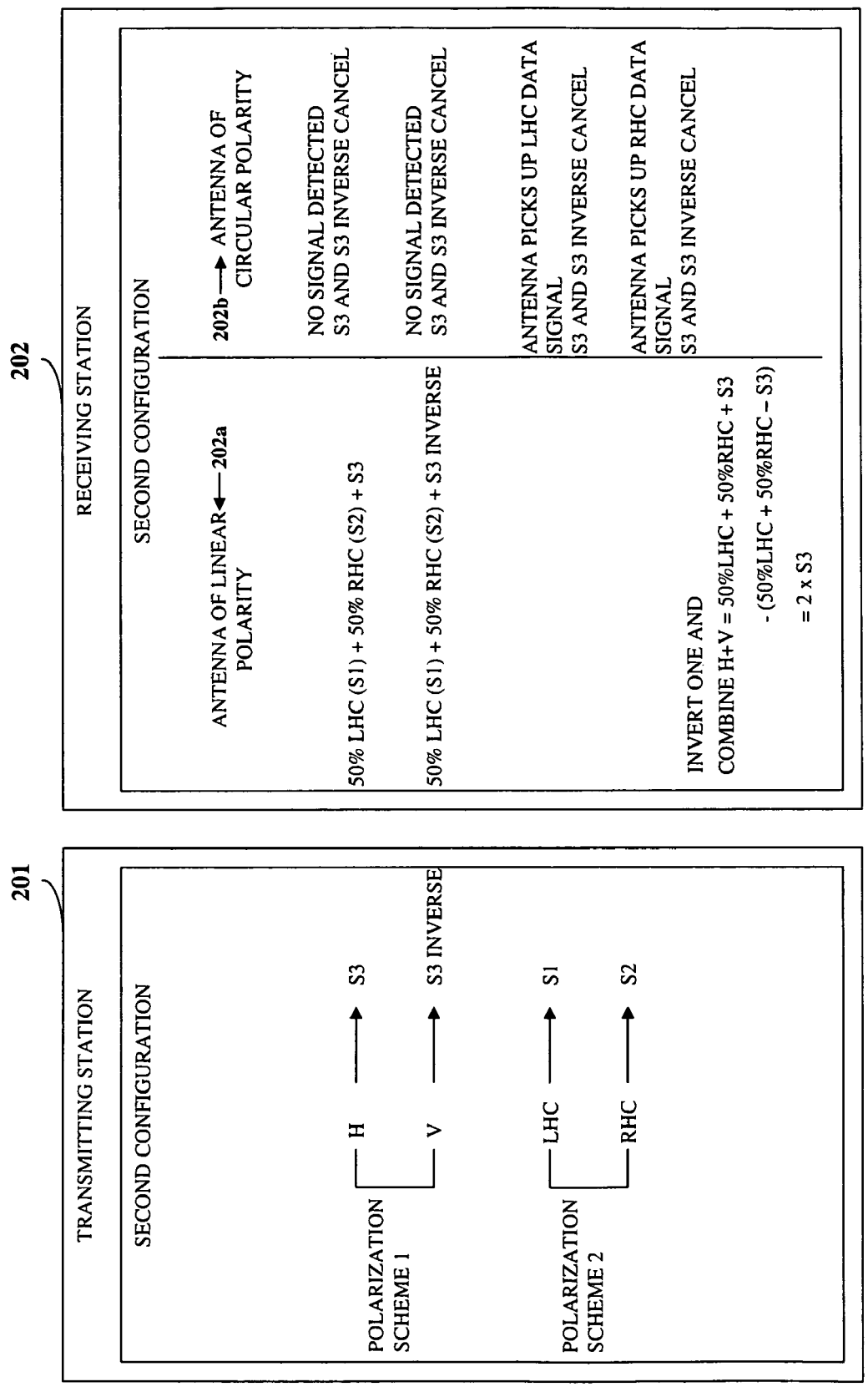
FIG. 4 exemplarily illustrates reception of data signals transmitted in a second configuration at a receiving station.

FIG. 4 exemplarily illustrates reception of data signals transmitted in a second configuration at a receiving station 202. In the second configuration, to receive the third data signal (S3), an antenna 202a of linear polarity that can receive separately both linearly polarized data signals is required. In the second configuration, the third data signal and the inverse of the third data signal are polarized in the first polarization scheme, and the first data signal and the second data signal are polarized in the second polarization scheme. For example, the third data signal is a horizontally (H) polarized data signal (S3), the inverse of the third data signal is a vertically (V) polarized data signal (S3 inverse), the first data signal is a left hand circularly (LHC) polarized data signal (S1), and the second data signal is a right hand circularly (RHC) polarized data signal (S2).

The horizontal polarity of the antenna 202a picks up S3 plus the RHC polarized second data signal S2 plus the LHC polarized first data signal S1. The vertical polarity of antenna 202a picks up the inverted S3 plus the RHC S2 plus the LHC S1. The data signal received at one polarity of the antenna 202a, for example, the vertical polarity is inverted. The result is inverted S1 plus inverted S2 plus inverse of inverted S3. The inverse of the inverted S3 with the included inverses of S1 and S2 is summed with the not inverted S3 S1, and S2. The circularly polarized data signals S1 and S2 and the inverted circularly polarized data signals S1 and S2 exactly cancel each other out. S3 matches the inverse of the inverted S3, resulting in a stronger signal S3 without interference from the two circularly polarized data signals S1 and S2.

In order to receive the circularly polarized data signals, a standard antenna is required that receives either the right or left hand circularly polarized data signals or both. The two linearly polarized data signals cancel each other out when received at the antenna 202b receive element or feed of circular polarity. Hence, only the circularly polarized data signals propagate past the antenna 202b, pick up element or feed of circular polarity to the electronics. Processing of the circularly polarized data signals occurs as it normally would.

The receiving station 202 receives either the circularly polarized data signals or the linearly polarized data signals. Even though the circularly polarized data signals and the linearly polarized data signals do not need to come from the same source, the third data signal and the inverse of the third data signal must be transmitted synchronously from the same place. The first data signal and the second data signal can be transmitted from anywhere, for example, from the same transmitting station 201 or from a separate transmitting station 201, since the third data signal and its inverse do not interfere with the first data signal and second data signal.

Consider an example where an existing satellite communicating from an orbital position using circularly polarized data signals is supplemented by a new satellite owned and operated by a different company. The new satellite has to transmit a linearly polarized data signal and an inverse of the linearly polarized data signal in opposite polarities. The two linearly polarized data signals do not interfere with any of the existing receiving stations 202, being of a different polarization scheme, and canceling each other out in the feeds of circular polarity of the receiving stations 202. The new satellite is able to provide about 50% additional capacity for the orbital position. The linearly polarized data signals and the circularly polarized data signals need not be transmitted by the same satellite. The opposite also applies, where a satellite transmitting linearly polarized data signals is supplemented by a satellite transmitting circularly polarized data signals, as long as inverse data signals, 180 degrees out of phase, are transmitted in opposite circular polarities.

Figure 5:
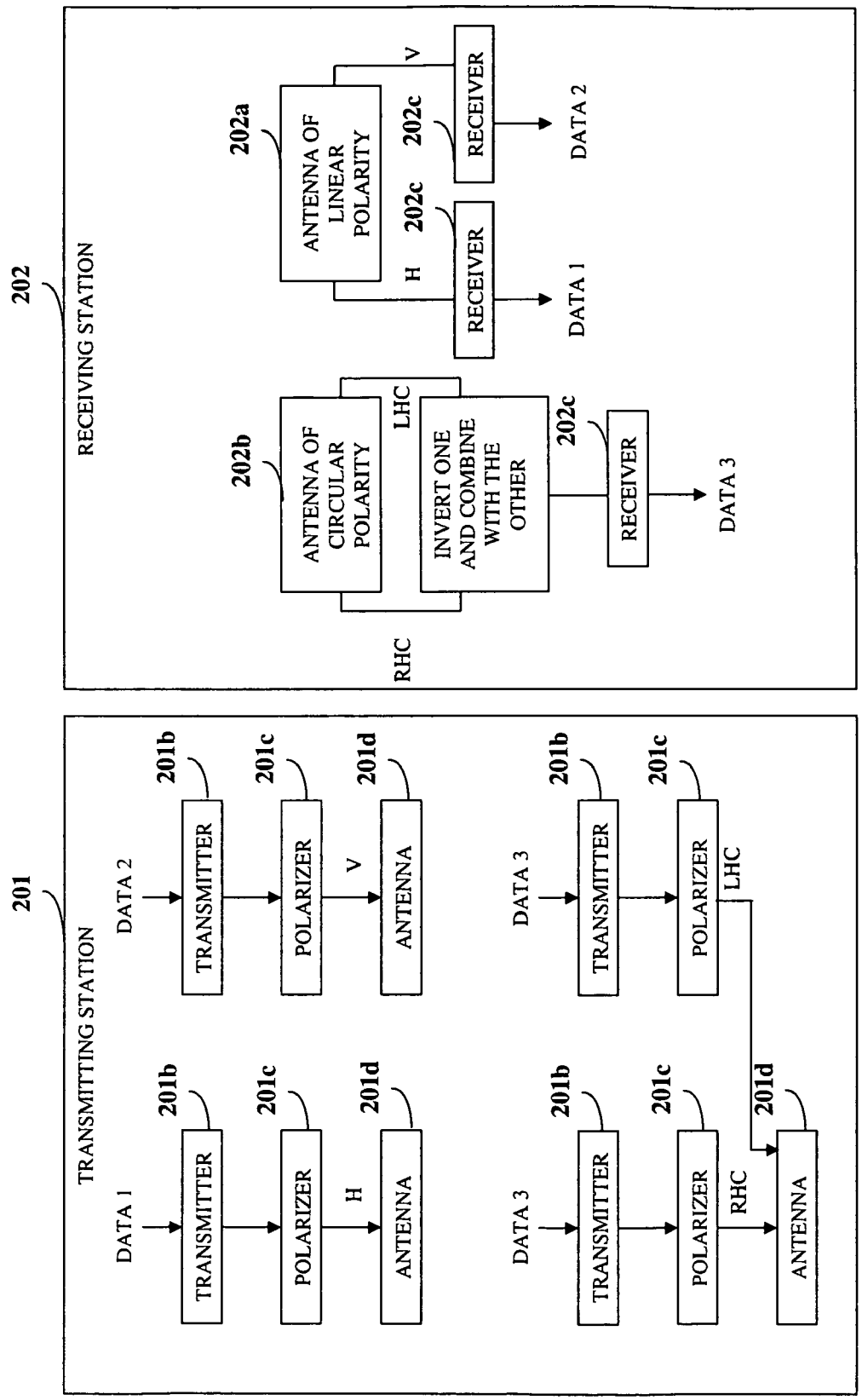
FIG. 5 exemplarily illustrates transmission and reception of data signals in a first configuration.

FIG. 5 exemplarily illustrates transmission and reception of data signals in a first configuration. Distinct data, for example, data 1, data 2, and data 3 are carried by data signals. At the transmitting station 201, each of the data signals conveying the distinct data are passed through a transmitter 201b and then a polarizer 201c for polarizing the data signals into a horizontally polarized data signal, a vertically polarized data signal, a right hand circularly polarized data signal, and a left hand circularly polarized data signal. Data 1 is carried by the horizontally polarized data signal represented by "H", data 2 is carried by the vertically polarized data signal represented by "V", and data 3 is carried by the circularly polarized data signals. Data 3 is carried by the right hand circularly polarized data signal represented by "RHC" and by the left hand circularly polarized data signal represented by "LHC". The polarized data signals are each sent to an antenna 201d for transmitting the polarized data signals. Each antenna 201d broadcasts the polarized data signals. At transmission, the LHC and the RHC transmitted signals are inverse from each other.

At the receiving station 202, when the polarized data signals are received by the antenna 202b of circular polarity, the RHC polarized data signal and the LHC polarized data signal are picked up. One of the circularly polarized data signals, for example, the LHC polarized data signal is inverted and combined with the other circularly polarized data signal, for example, the RHC polarized data signal for receiving the third data signal at increased signal strength, and cancelling the interfering linearly polarized signals. The stronger third data signal is sent to the receiver 202c to obtain data 3.

When the data signals are received by an antenna 202a of linear polarity at the receiving station 202, the horizontally (H) polarized data signal (S1) and the vertically (V) polarized data signal (S2) are picked up in the respective linear polarity, that is, horizontal polarity and vertical polarity of the antenna 202a respectively. The LHC polarized data signal S3 and the RHC polarized data signal S3 inverse cancel each other out on reception by an antenna 202a of linear polarity, as the RHC polarized data signal is the inverse of the LHC polarized data signal, and both are received together at the same level. The antenna 202a of linear polarity distinguishes between the H polarized data signal and the V polarized data signal and sends one or both of the data signals to one or multiple receivers 202c for obtaining data 1 and data 2. Since the circularly polarized data signals cancel in the antenna 202a or feed or pick up element of the linear polarity, the linearly polarized data signals are processed as they normally would be without interference from the circularly polarized signals.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. As an example, much of the description references radio frequency communications. This invention also applies to light frequency communications and higher frequency communications where emitters and filters might be used. This invention applies to all electromagnetic transmissions that can be polarized, and is not intended to be limited to any frequency range. Those skilled in the art, having the benefit of the teachings of this specification, may effect numerous modifications thereto and changes may be made without departing from the scope and spirit of the invention in its aspects.

I claim:

1. A method of wirelessly communicating distinct data over a same frequency using polarized data signals, comprising the steps of:
   providing a plurality of data signals conveying information, wherein said data signals comprise a first data signal conveying first data, a second data signal conveying second data, and a third data signal and an inverse of said third data signal conveying third data, wherein said data signals are of said same frequency;
   polarizing said first data signal and said second data signal in opposite polarities of one of a first polarization scheme and a second polarization scheme, and polarizing said third data signal and an inverse of said third data signal in opposite polarities of other of said first polarization scheme and said second polarization scheme, wherein said third data signal, and inverse of said third data signal are transmitted along a same transmission path transmitting said third data signal and said inverse of said third data signal in said first polarization scheme from one transmitting station; and
   transmitting said polarized first data signal and said polarized second data signal from one of said one transmitting station and other transmitting stations along one of said same transmission path and/or proximate transmission paths, to one or more receiving stations; and
   receiving said transmitted data signals in said first polarization scheme and said second polarization scheme at said one or more receiving stations, wherein said first data, said second data, and said third data are obtained from said received data signals comprising said first data signal, said second data signal, said third data signal and an inverse of said third data signal;
   whereby amount of distinct data transmitted to said receiving stations over said same frequency is increased.

2. The method of claim 1, wherein in a first configuration said first data signal and said second data signal are polarized in said first polarization scheme, and said third data signal and said inverse of said third data signal are polarized in said second polarization scheme, wherein said first polarization scheme is linear polarization and said second polarization scheme is circular polarization.

3. The method of claim 2, wherein in said first configuration one of said third data signal and said inverse of said third data signal are inverted and summed with other one of said inverse of said third data signal and said third data signal at an antenna of second polarity at said receiving stations for obtaining said third data at increased strength, and wherein said first data signal and said second data signal cancel out at said summation, wherein said antenna of said second polarity is an antenna of circular polarity.

4. The method of claim 2, wherein phase and level of said third data signal and said inverse of said third data signal polarized in said second polarization scheme are adjusted at transmission for enabling said third data signal and said inverse of said third data signal to cancel each other out at an antenna of first polarity at said receiving stations, wherein said antenna of first polarity is an antenna of linear polarity.

5. The method of claim 1, wherein in a second configuration said third data signal and said inverse of said third data signal are polarized in said first polarization scheme, and said first data signal and said second data signal are polarized in said second polarization scheme, wherein said first polarization scheme is linear polarization and said second polarization scheme is circular polarization.

6. The method of claim 5, wherein in said second configuration one of said third data signal and said inverse of said third data signal is inverted and summed with other one of said inverse of said third data signal and said third data signal at an antenna of first polarity at said receiving stations for obtaining said third data at increased strength, and wherein said first data signal and said second data signal cancel out at said summation, and wherein said antenna of first polarity is an antenna of linear polarity.

7. The method of claim 5, wherein phase and level of said third data signal and said inverse of said third data signal polarized in said first polarization scheme are adjusted at transmission for enabling said third data signal and said inverse of said third data signal to cancel each other out at reception at an antenna of second polarity at said receiving stations, wherein said antenna of said second polarity is an antenna of circular polarity.

8. The method of claim 1, wherein said data signals polarized in said opposite polarities of said first polarization scheme comprising a horizontally polarized signal and a vertically polarized signal, wherein said first polarization scheme is linear polarization.

9. The method of claim 1, wherein said data signals polarized in said opposite polarities of said second polarization scheme comprise a right hand circularly polarized signal and a left hand circularly polarized signal, wherein said second polarization scheme is circular polarization.

10. The method of claim 1, wherein said first data signal and said second data signal are transmitted from one of a single transmitting station and a plurality of said transmitting stations and are received at one of a single receiving station and a plurality of said receiving stations.

11. The method of claim 1, wherein said third data signal and said inverse of said third data signal are transmitted from one of said transmitting stations in one polarization scheme and received together at an antenna at one of said receiving stations of the opposite polarization scheme for enabling said third data signal and said inverse of said third data signal to cancel each other out when received together at said same antenna.

12. The method of claim 1, wherein said first data and said second data are same.

13. The method of claim 1, further comprising the steps of:
   transmitting said third data signal in a polarization scheme and transmitting inverse of said third data signal in an opposite polarity of said polarization scheme;
   receiving said third data signal in said polarization scheme and said inverse of said third data signal in said opposite polarity of said polarization scheme at an antenna;
   inverting one of said third data signal in said polarization scheme and said inverse of said third data signal in said opposite polarity of said polarization scheme, and summing said inverted one of said third data signal and said inverse of said third data signal to other one of said third data signal and said inverse of said third data signal; and transmitting said first data signal and said second data signal using a different polarization scheme.

14. A method of wirelessly communicating distinct data over a same frequency using a plurality of polarized data signals, comprising the steps of:
providing a plurality of data signals conveying information, wherein said data signals comprise a first data signal conveying first data, a second data signal conveying second data, and a third data signal and an inverse of said third data signal conveying third data, wherein said data signals are of said same frequency;
polarizing a first set of said data signals in a first polarization scheme and a second set of said data signals in a second polarization scheme, wherein said first set of polarized data signals comprises said first data signal and said second data signal, wherein said second set of polarized data signals comprises two identical carrier signals one combined with said third data signal and the other combined with said inverse of said third data signal;
transmitting said polarized data signals from one or more transmitting stations to one or more receiving stations along one of a same transmission path and proximate transmission paths; and
receiving said transmitted data signals comprising said first data signal and said second data signal in said first polarization scheme, and said third data signal and inverse of said third data signal in said second polarization scheme at said one or more receiving stations, wherein said first data, said second data, and said third data are obtained from said received data signals;
whereby amount of distinct data transmitted to said one or more receiving stations over said same frequency is increased.

15. The method of claim 14, wherein two polarized signals are transmitted on two different polarities of a single polarization scheme from a same antenna, wherein said two polarized signals are:
a first signal comprising a carrier signal and a data signal; and
a second signal comprising a carrier signal and an inverse of said data signal.

16. The method of claim 15, wherein signals other than said two of said polarized signals have a guard band falling exactly on frequency of carrier signal of each of said other signals.

17. A system for wirelessly communicating distinct data over a same frequency using a plurality of polarized data signals, comprising:
a source for providing a plurality of data signals conveying information, wherein said data signals comprise a first data signal conveying first data, a second data signal conveying second data, and a third data signal and an inverse of said third data signal conveying third data, wherein said data signals are of said same frequency;
a polarizer for polarizing said first data signal and said second data signal in one of a first polarization scheme and a second polarization scheme and a polarizer for polarizing said third data signal and inverse of said third data signal in the other of said first polarization scheme and said second polarization scheme;
one or more transmitting stations for transmitting said polarized data signals to one or more receiving stations, wherein said third data signal and said inverse of said third data signal is transmitted from one of said transmitting stations in said first polarization scheme, and wherein said first data signal is transmitted from one of said transmitting stations and other of said transmitting stations in said second polarization scheme, and wherein said second data signal is transmitted from one of said transmitting stations and other of said transmitting stations; and
said receiving stations comprising antennas of a first polarity and of a second polarity for receiving said transmitted data signals, wherein said first data, said second data, and said third data are obtained from said received data signals.

18. The system of claim 17, wherein at least one of said receiving stations receives said third data signal in one polarity of a polarization scheme and said inverse of said third data signal in an opposite polarity of said polarization scheme, inverts one of said third data signal received in said one polarity and said inverse of said third data signal received in said opposite polarity, and sums said inverted one of said third data signal and said inverse of said third data signal with other one of said third data signal in said one polarity and said inverse of third data signal from said opposite polarity of said polarization scheme.

* * * * *